(12) United States Patent
Jeng et al.

(10) Patent No.: US 9,647,860 B2
(45) Date of Patent: May 9, 2017

(54) SOFT DEMAPPER, CALCULATING SYSTEM, AND METHOD FOR CALIBRATING SOFT DATA OF MULTIMEDIA DATA STREAM

(71) Applicant: MStar Semiconductor, Inc., Hsinchu Hsien (TW)

(72) Inventors: You-Tsai Jeng, Hsinchu Hsien (TW); Tai-Lai Tung, Hsinchu Hsien (TW); Tung-Sheng Lin, Hsinchu Hsien (TW); Ching-Fu Lan, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 524 days.

(21) Appl. No.: 14/140,847

(22) Filed: Dec. 26, 2013

(65) Prior Publication Data
US 2014/0204997 A1 Jul. 24, 2014

(30) Foreign Application Priority Data

Jan. 18, 2013 (TW) .............................. 102101941 A

(51) Int. Cl.
| | |
|---|---|
| H04N 7/12 | (2006.01) |
| H04N 11/02 | (2006.01) |
| H04N 11/04 | (2006.01) |
| H04L 25/06 | (2006.01) |

(Continued)

(52) U.S. Cl.
CPC ............ H04L 25/067 (2013.01); *H04N 5/455* (2013.01); *H04N 21/4382* (2013.01)

(58) Field of Classification Search
None
See application file for complete search history.

(56) References Cited

U.S. PATENT DOCUMENTS

| | | | |
|---|---|---|---|
| 2002/0136320 A1* | 9/2002 | Jin | ......................... H04L 1/0043 |
| | | | 375/265 |
| 2007/0041437 A1* | 2/2007 | Kuo | ..................... H04B 17/345 |
| | | | 375/227 |

(Continued)

FOREIGN PATENT DOCUMENTS

| | | | |
|---|---|---|---|
| CN | 101471749 | * | 12/2007 |
| CN | 101471749 | * | 7/2009 ............... H04L 1/00 |

OTHER PUBLICATIONS

Kim et al, "One-Dimensional Soft-Demapping using Decorrelation with Interference Cancellation for Rotated QAM Constellations", Jan. 2012.*

(Continued)

*Primary Examiner* — Talha M Nawaz
(74) *Attorney, Agent, or Firm* — WPAT, PC; Justin King; Jonathan Chiang

(57) ABSTRACT

By determining a scaling factor for scaling signals according to a signal having low bit error rates, and by adjusting soft data using the scaling factor, when soft data are simulated using the Gaussian Model having obvious errors with respect to reality, impacts of signals having low bit error rates are effectively amplified so that impacts of signals having high bit error rates are effectively reduced on the contrary. As a result, the obvious errors introduced by using the Gaussian Model and a low broadcast quality of digital television signals caused by said obvious errors can be neutralized.

8 Claims, 4 Drawing Sheets

(51) Int. Cl.
*H04N 5/455* (2006.01)
*H04N 21/438* (2011.01)

(56) References Cited

U.S. PATENT DOCUMENTS

| | | | | |
|---|---|---|---|---|
| 2007/0288832 A1* | 12/2007 | Adachi | ............... | H03M 13/27 |
| | | | | 714/780 |
| 2008/0291819 A1* | 11/2008 | Gho | ............... | H04L 1/0052 |
| | | | | 370/208 |
| 2009/0316841 A1* | 12/2009 | Li | ............... | H04L 1/0045 |
| | | | | 375/346 |
| 2011/0035647 A1* | 2/2011 | Eidson | ............... | H03G 3/3068 |
| | | | | 714/780 |

OTHER PUBLICATIONS

China Patent Office "Offce Action" issued on Nov. 2, 2016, China.

\* cited by examiner

150# SOFT DEMAPPER, CALCULATING SYSTEM, AND METHOD FOR CALIBRATING SOFT DATA OF MULTIMEDIA DATA STREAM

CROSS REFERENCE TO RELATED APPLICATIONS

This application claims priority under 35 U.S.C 119 to Taiwan patent application, TW102101941, filed on Jan. 18, 2013, the disclosure of which is incorporated herein by reference.

BACKGROUND OF THE INVENTION

1. Field of the Invention

The present invention discloses a method of calibrating soft data of multimedia data streams, a soft demapper and a multimedia data stream calculating system, and more particularly, to a method of calibrating soft data by a scaling factor corresponding to lowest bit error rate (BER), a soft demapper utilizing the mentioned method above, and a multimedia data stream calculating system utilizing the provided soft demapper.

2. Description of the Prior Art

With respect to multimedia data streams propagated in digital television (TV) channels, an ideal Gaussian Model is usually applied in the simulations of channel (propagation) models for various channel signals. However, if the digital TV signals are propagated in high-density urban areas or fully scattering environments, the simulation results according to the ideal Gaussian Model may have significant errors or deviations compared to real channel propagation models of various digital TV channel signals.

Generally, multimedia data stream of digital TV signal contains soft data, which is simulated and computed according to Gaussian Model. Hence, when simulation with Gaussian Model have significant deviations/errors compared to that in real situation in digital TV channel signal propagations, the correctness of data detection in multimedia data streams can be deteriorated seriously, and broadcasting quality of multimedia data stream in the digital TV signals by digital TV is also downgraded in consequence.

Please refer to FIG. 1, which illustrates a signal strength diagram with respect to signal propagation of digital TV channels simulated according to a non-ideal channel model. As shown in the FIG. 1, a simulated signal strength ceiling SUP is generated when Gaussian Model is used to simulate channel model of the digital TV signal. For digital TV signal receiver, in high-density urban areas or fully scattering environment, frequency variation of received signal (or symbol) can be overly large (the phenomenon is called fading), such that the signal strength of real digital TV signal RL may exceed the simulated signal strength ceiling SUP. Under such circumstances, the signal strength exceeding SUP is treated as the simulated signal strength ceiling SUP in Gaussian Model simulation. As a result, obvious errors are induced after the signals exceeding the ceiling SUP are converted to soft data. And playing quality of digital TV signal would be seriously downgraded in consequence.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In order to solve obvious errors induced by soft data conversion according to Gaussian Model and downgraded playing quality issue of digital TV signal, the present application discloses a method of calibrating soft data of multimedia data streams, a soft demapper, and a multimedia data stream calculating system.

The method for calibrating soft data in multimedia data streams, comprising: calculating a plurality of first soft data in a multimedia data stream; searching for a scaling factor in a lookup table, the scaling factor being corresponding to channel information and encoding rate information carried in the multimedia data stream, wherein the lookup table stores multiple combinations of multiple sets of channel information and multiple encoding rates, each of which comprises information of a scaling factor corresponding to a lowest bit error rate; determining a first channel response according to the channel information and performing correlation operation on the first channel response and the found scaling factor to generate a second channel response; and combining the second channel response and the plurality of first soft data to generate a plurality of second soft data.

The soft demapper comprises a soft data generator, a scaling factor determination module, a channel response generation module, and a dynamic channel calibration module. The soft data generator is configured to calculate a plurality of first soft data in a multimedia data stream. The scaling factor determination module is configured to search for a scaling factor in a lookup table, the scaling factor being corresponding to channel information and encoding rate information carried in the multimedia data stream. The lookup table stores multiple combinations of multiple sets of channel information and multiple encoding rates, each of which comprises information of a scaling factor corresponding to a lowest bit error rate. The channel response generation module is configured to determine a first channel response according to the channel information and to perform correlation operation on the first channel response and the found scaling factor to generate a second channel response. The dynamic channel calibration module is configured to combine the second channel response and the plurality of first soft data to generate a plurality of second soft data.

A multimedia data stream calculating system comprises a front end module, a soft demapper, and a back end module. The front end module is configured to perform channel equalizing, automatic gain control, and bit interleaving operations on a first multimedia data stream to generate a second multimedia data stream. The soft demapper comprises a soft data generator, a scaling factor determination module, a channel response generation module, and a dynamic channel calibration module. The soft data generator is configured to calculate a plurality of first soft data in the second multimedia data stream. The scaling factor determination module is configured to search for a scaling factor in a lookup table, the scaling factor being corresponding to channel information and encoding rate information carried in the multimedia data stream. The lookup table stores multiple combinations of multiple sets of channel information and multiple encoding rates, each of which comprises information of a scaling factor corresponding to a lowest bit error rate. The channel response generation module is configured to determine a first channel response according to the channel information and to perform correlation operation on the first channel response and the found scaling factor to generate a second channel response. The dynamic channel calibration module is configured to combine the second channel response and the plurality of first soft data to generate a plurality of second soft data. The back end module is configured to perform bit de-interleaving and decoding on the plurality of second soft data to generate a third multimedia data stream.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
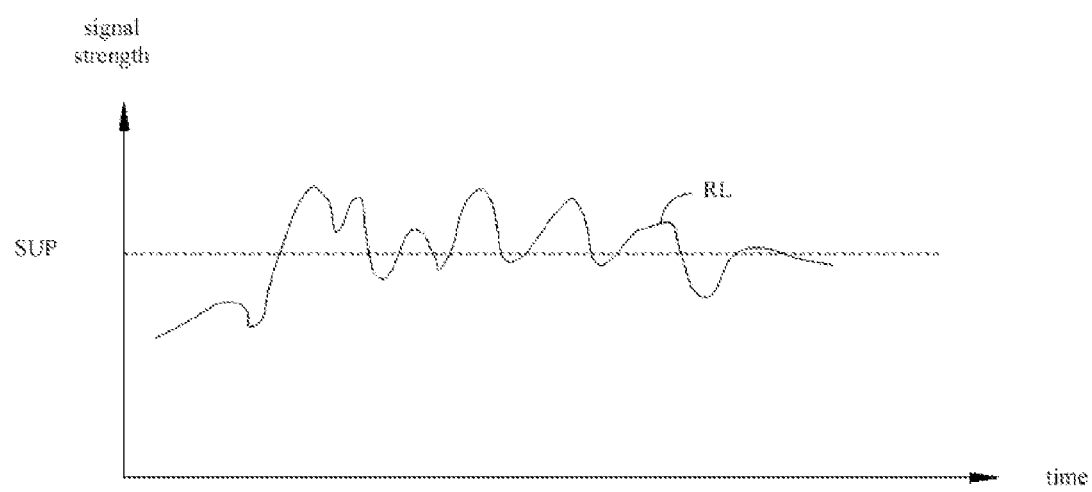
FIG. 1 is a signal strength diagram with respect to signal propagation of digital TV channels simulated according to a non-ideal channel model.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2:
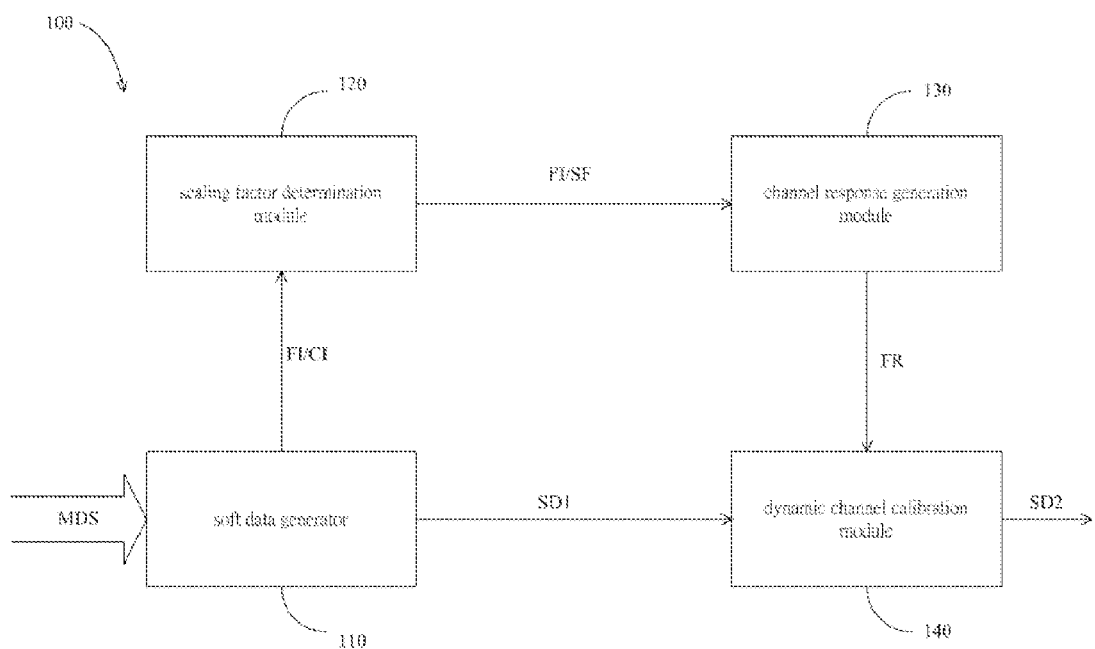
FIG. 2 is a block diagram of a soft demapper disclosed according to an embodiment of the present invention.

Please refer to the FIG. 2, which shows a block diagram of a soft demapper disclosed according to an embodiment of the present invention. As shown in the FIG. 2, the soft demapper 100 comprises a soft data generator 110, a scaling factor determination module 120, a channel response generation module 130, and a dynamic channel calibration module 140.

The soft data generator 110 is configured to calculate a plurality of first soft data SD1 in one received multimedia data stream MDS.

The scaling factor determination module 120 is configured to search for a scaling factor SF corresponding to channel information FI and encoding rate information CI in a lookup table stored in the scaling factor determination module 120 according to the channel information FI and encoding rate information CI contained in the multimedia data stream MDS. The details of searching for the scaling factor in the lookup table would be described later.

The channel response generation module 130 is configured to generate a channel response FR according to a correlation operation on the found scaling factor SF and an initial channel response which is determined according to the channel information FI.

The dynamic channel calibration module 140 is configured to generate a plurality of second soft data SD2, as the output signal of the soft demapper 100, according to the channel response FR and the plurality of first soft data SD1.

Figure 3:
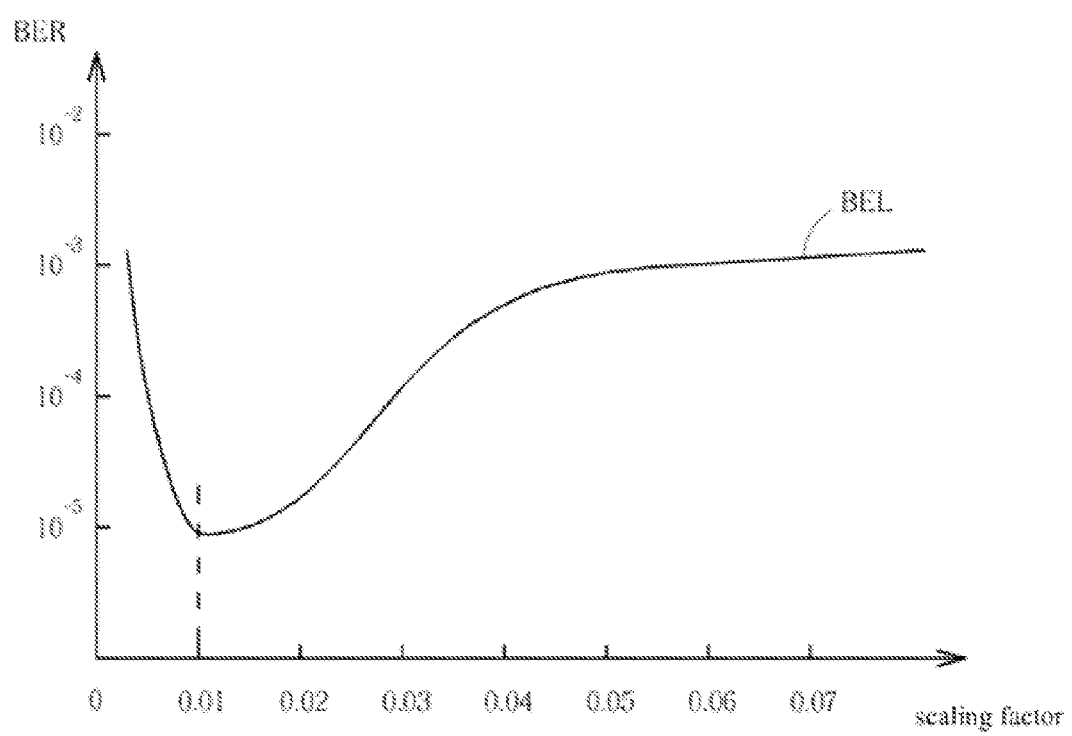
FIG. 3 is a diagram of a relationship curve corresponding to the scaling factor and the bit error rate.

The scaling factor determination module 120 utilizes the look-up table to determine the scaling factor SF, where the look-up table is related to a curve defined by the scaling factor and the bit error rate (BER). Please refer to FIG. 3, it shows a schematic diagram of the curve BEL defined by the scaling factors and the BERs. The curve BEL shown in the FIG. 3 is defined using various BERs of the soft demapper 100 estimated with respect to various scaling factors. For example, after the curve BEL is generated, assuming the lowest bit error rate BERmin exists at where the scaling factor equals to 0.01, then the 0.01 value of scaling factor, the corresponding channel response and encoding rate, with respect to the curve BEL, becomes an entry in the lookup table. In other words, the lookup table stores entries of scaling factors corresponding to the lowest bit error rates under various combinations of channel response and encoding rate.

Therefore, when the channel information and the encoding rate carried in the multimedia data stream MDS both match the channel response and the encoding rate in the curve, the scaling factor value 0.01 is used for the calibration of soft data. In other words, the combination of channel response and encoding rate would be used as an index by the scaling factor determination module 120 to search in the lookup table; in this particular case, the scaling factor value 0.01 is found according to the index.

Using scaling factor corresponding to the lowest BER amplifies the influence of signals with low BER and de-emphasizes the influence of signals with relatively high BER. In consequence, the errors between the simulated soft data and the real soft data generated from real digital TV signal are reduced to an extent that can be ignored. Hence, the quality of digital TV signal improves accordingly.

Figure 4:
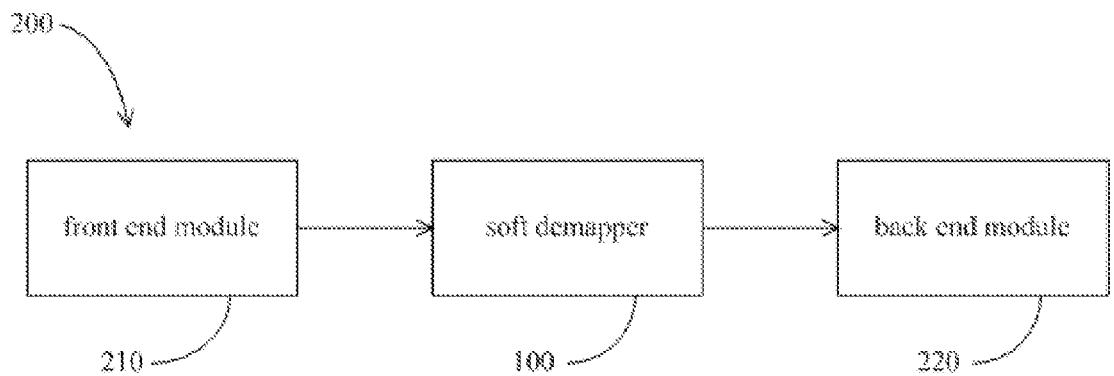
FIG. 4 is a block diagram showing a multimedia data stream calculating system utilizing the disclosed soft demapper in accordance with an embodiment of the present invention.

FIG. 4 depicts a block diagram showing a multimedia data stream calculating system 200 utilizing the soft demapper 100 in accordance with an embodiment of the present invention. As shown in the FIG. 4, in addition to the soft demapper 100, the multimedia data stream calculating system 200 further comprises a front end module 210 and a back end module 220.

The front end module 210 is configured to perform channel equalizing, automatic gain control, and bit inter-leaving operations on an initial multimedia data stream to generate the multimedia data stream MDS to be sent to the soft demapper 100.

The back end module 220 is configured to perform bit de-interleaving and decoding on the plurality of second soft data SD2 to generate the ultimate multimedia data stream to be played.

In one embodiment of the present invention, the multimedia data streams conform to ISDB-T (Integrated Services Digital Broadcasting-Terrestrial) protocol.

In one embodiment of the present invention, the channel responses indicated by the channel information FI comprise at least 16-point Quadrature Amplitude Modulation (QAM), 64-point QAM, or 4-bit Quadrature Phase-Shift Keying (QPSK).

In one embodiment of the present invention, the mentioned soft data can be Log-Likelihood Ratio (LLR) representing likelihood to the real soft data. One of LLR calculation methods could be formulated as follows:

$$LLR(\text{real}) = \frac{2x}{Q_x} \quad (1)$$

$$LLR(I) = \frac{2y}{Q_y} \quad (2)$$

$$LLR = LLR(\text{real}) + i \cdot LLR(\text{image}) \quad (3)$$

where LLR represents the calculated likelihood value, LLR (real) represents the real part of LLR value, and LLR(image) represents the imaginary part; where x and y are the real part and the imaginary part of a symbol r, respectively; where LLR represents the soft data of the symbol r; $Q_x$ and $Q_y$ represent the real part variance and the imaginary part variance of the normal distribution of the symbol r, respectively. The calculations of Formula (1) and (2) are described below.

In the normal distribution space $N(0, Q^2)$ of the symbol r, the probability density function could be represented as:

$$f(x) = \frac{1}{\sqrt{2\pi Q^2}} * \exp\left(-\frac{(x-\mu)^2}{2Q^2}\right) \quad (4)$$

where exp( ) represents an natural exponential function on the basis of natural numbers. The definition of LLR(real) is the logarithm function of the probability density functions ratio of the real part of the symbol r equal to 1 and equal to −1 (minus one), represented as follows:

$$\begin{aligned}LLR_x &= \log\left(\frac{f(r|x=+1)}{f(r|x=-1)}\right) \\ &= \log\left(\exp\left(\frac{-(x-1)^2 - [-(x+1)^2]}{2Q_x^2}\right)\right) \\ &= \frac{2x}{Q_x^2}\end{aligned} \quad (5)$$

Similarly, the definition of the LLR(image) is the logarithm function of the probability density functions ratio of the imaginary part of the symbol equal to 1 and equal to −1 (minus one), represented as follows:

$$\begin{aligned}LLR_y &= \log\left(\frac{f(r|y=+1)}{f(r|y=-1)}\right) \\ &= \log\left(\exp\left(\frac{-(y-1)^2 - [-(y+1)^2]}{2Q_y^2}\right)\right) \\ &= \frac{2y}{Q_y^2}\end{aligned} \quad (6)$$

In one embodiment of the present invention, the channel information FI and encoding rate information CI are obtained from or determined by the scaling factor determination module 120 according to TMCC (Transmission and Multiplexing Configuration Control), information carried in the multimedia data stream MDS for performing search on the lookup table.

Figure 5:
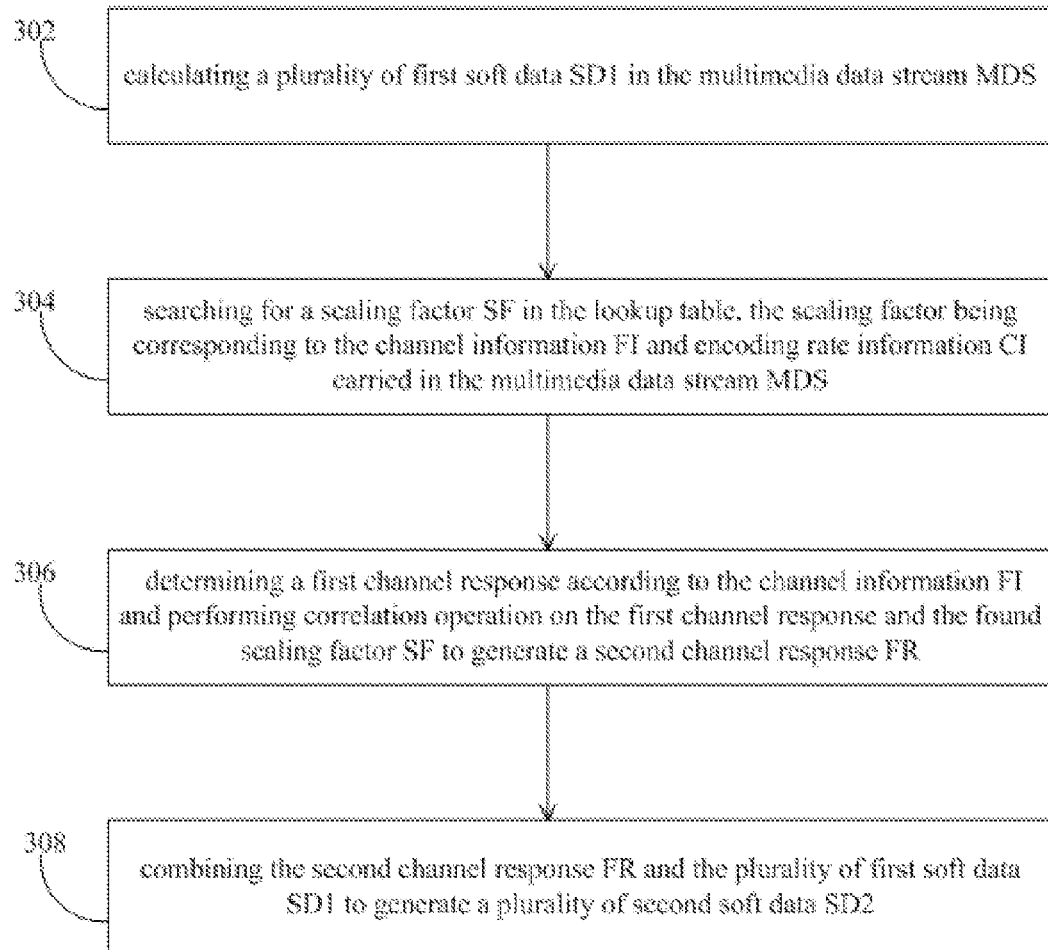
FIG. 5 is a flowchart diagram showing a method for calibrating soft data of the multimedia data stream in accordance of an embodiment of the present invention.

Please refer to FIG. 5, which depicts a flowchart diagram showing a method for calibrating soft data of the multimedia data stream in accordance of an embodiment of the present invention. As shown in the FIG. 5, the method comprises steps as follows:

Step 302: calculating a plurality of first soft data SD1 in the multimedia data stream MDS.

Step 304: searching for a scaling factor SF in the lookup table, the scaling factor being corresponding to the channel information FI and encoding rate information CI carried in the multimedia data stream MDS.

Step 306: determining a first channel response according to the channel information FI and performing correlation operation on the first channel response and the found scaling factor SF to generate a second channel response FR.

Step 308: combining the second channel response FR and the plurality of first soft data SD1 to generate a plurality of second soft data SD2.

Please be aware that any embodiments generated from reasonable combinations of steps shown in the FIG. 5 and/or any mentioned constraints are treated as embodiments in accordance with the present invention.

The present invention discloses a method of calibrating soft data of multimedia data stream, a soft demapper and a multimedia data stream calculating system. According to the disclosure of the present invention, the soft data with outstanding deviation/errors caused from simulation with Gaussian Model can be calibrated by amplifying effects of signals with low bit error rate and reducing effects of signals with high bit error rate. Thus, the broadcast quality is effectively maintained.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A soft demapper, comprising:
    a soft data generator, configured to calculate a plurality of first soft data in a multimedia data stream;
    a scaling factor determination module, configured to search for a scaling factor in a lookup table, the scaling factor being corresponding to channel information and encoding rate information carried in the multimedia data stream, wherein the lookup table stores multiple combinations of multiple sets of channel information and multiple encoding rates, each of which comprises information of a scaling factor corresponding to a lowest bit error rate;
    a channel response generation module, configured to determine a first channel response according to the channel information and to perform correlation operation on the first channel response and the found scaling factor to generate a second channel response; and
    a dynamic channel calibration module, configured to combine the second channel response and the plurality of first soft data to generate a plurality of second soft data;
    wherein the scaling factor determination module further determines the channel information and the encoding rate information according to Transmission and Multiplexing Configuration Control (TMCC) information carried in the multimedia data stream.

2. The soft demapper of claim 1, wherein the multimedia data stream conforms to Integrated Services Digital Broadcasting-Terrestrial (ISDB-T) protocol.

3. The soft demapper of claim 1, wherein the first channel response corresponding to the channel information comprises 16-point Quadrature Amplitude Modulation (16-

QAM), 64-point Quadrature Amplitude Modulation (64-QAM), or 4-bit Quadrature Phase Shifting Keying (QPSK).

4. The soft demapper of claim 1, wherein the plurality of first soft data or the plurality of second soft data are a plurality of Log Likelihood Ratio (LLR).

5. A multimedia data stream calculating system, comprising:
   a front end module, configured to perform channel equalizing, automatic gain control, and bit interleaving operations on a first multimedia data stream to generate a second multimedia data stream;
   a soft demapper, comprising:
   a soft data generator, configured to calculate a plurality of first soft data in the second multimedia data stream;
   a scaling factor determination module, configured to search for a scaling factor in a lookup table, the scaling factor being corresponding to channel information and encoding rate information carried in the second multimedia data stream, wherein the lookup table stores multiple combinations of multiple sets of channel information and multiple encoding rates, each of which comprises information of a scaling factor corresponding to a lowest bit error rate;
   a channel response generation module, configured to determine a first channel response according to the channel information and to perform correlation operation on the first channel response and the found scaling factor to generate a second channel response;
   and a dynamic channel calibration module, configured to combine the second channel response and the plurality of first soft data to generate a plurality of second soft data; and a back end module, configured to perform bit de-interleaving and decoding on the plurality of second soft data to generate a third multimedia data stream
   wherein the scaling factor determination module further determines the channel information and the encoding rate information according to Transmission and Multiplexing Configuration Control (TMCC) information carried in the multimedia data stream.

6. The multimedia data stream calculating system of claim 5, wherein the multimedia data stream conforms to Integrated Services Digital Broadcasting-Terrestrial (ISDB-T) protocol.

7. The multimedia data stream calculating system of claim 5, wherein the first channel response corresponding to the channel information comprises 16-point Quadrature Amplitude Modulation (16-QAM), 64-point Quadrature Amplitude Modulation (64-QAM), or 4-bit Quadrature Phase Shifting Keying (QPSK).

8. The multimedia data stream calculating system of claim 5, wherein the plurality of first soft data or the plurality of second soft data are a plurality of Log Likelihood Ratio (LLR).

* * * * *